Patented June 10, 1941

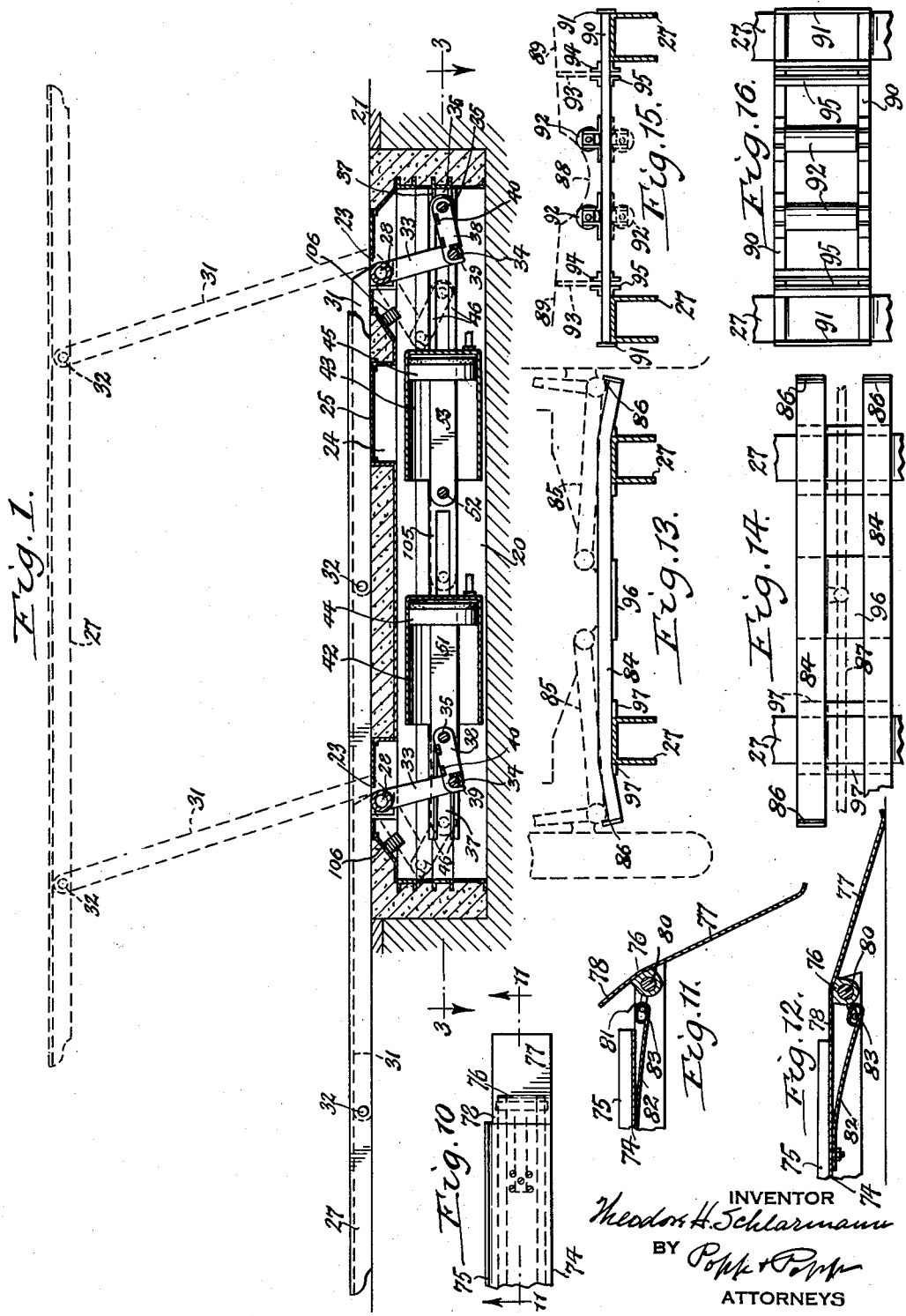

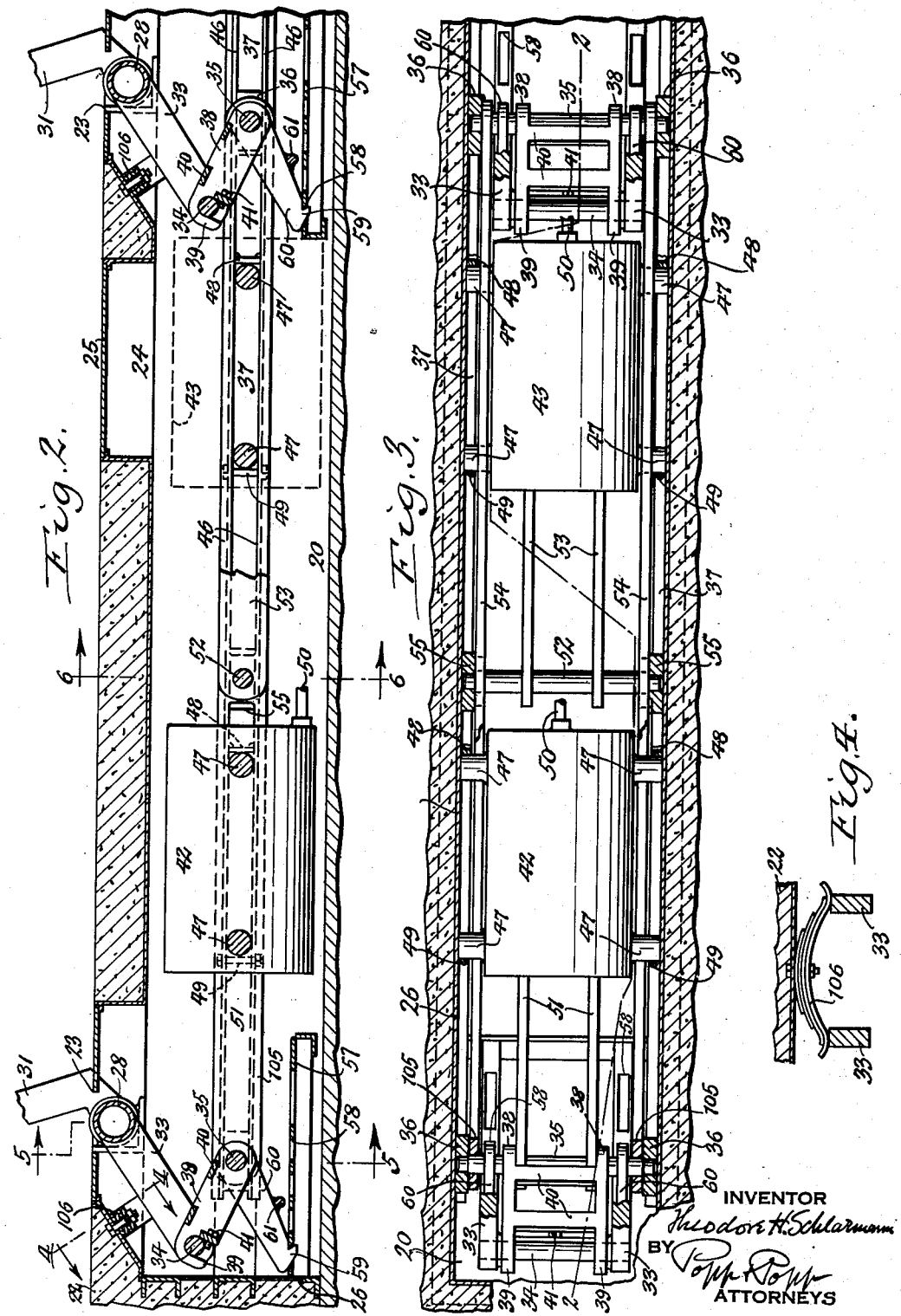

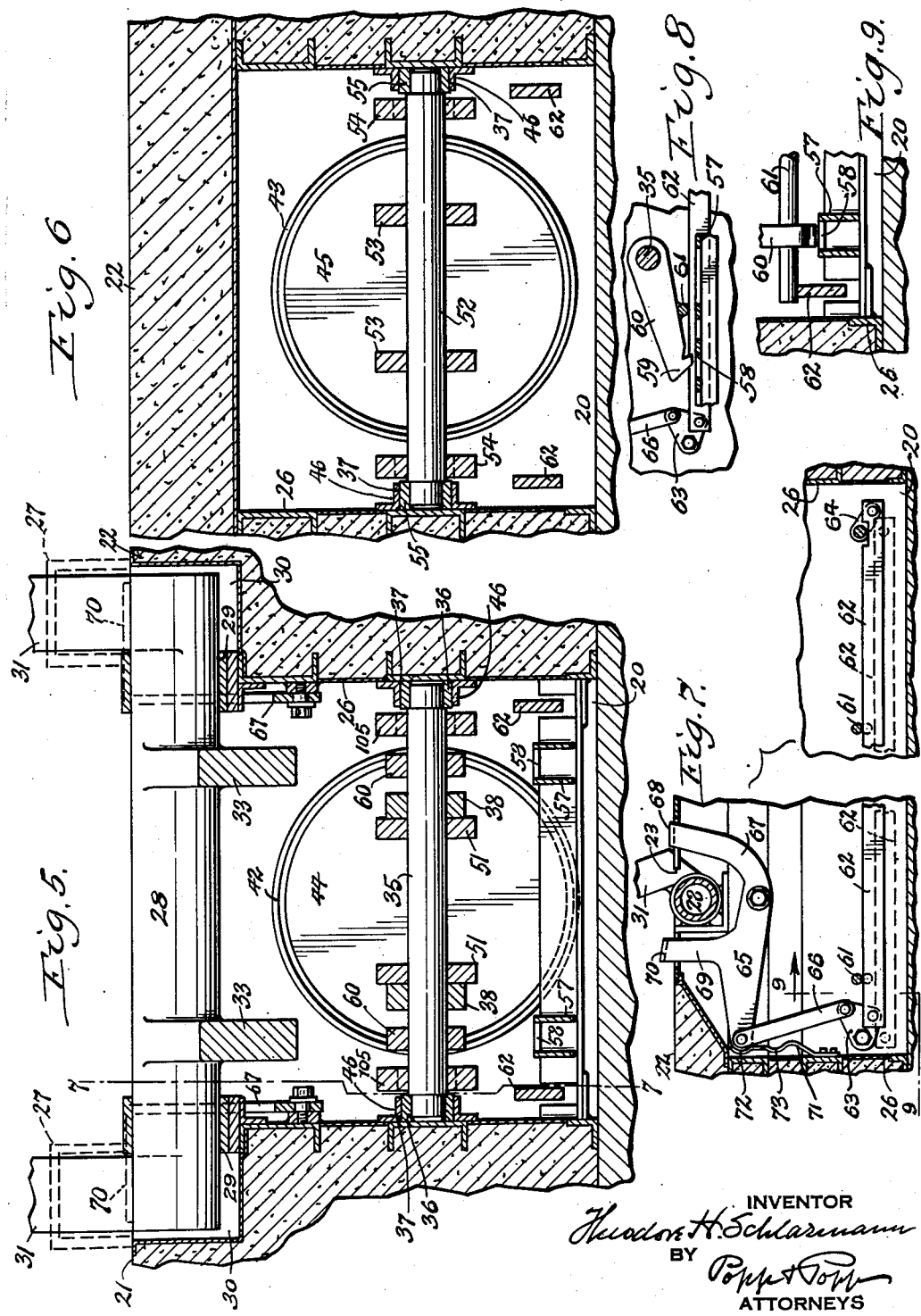

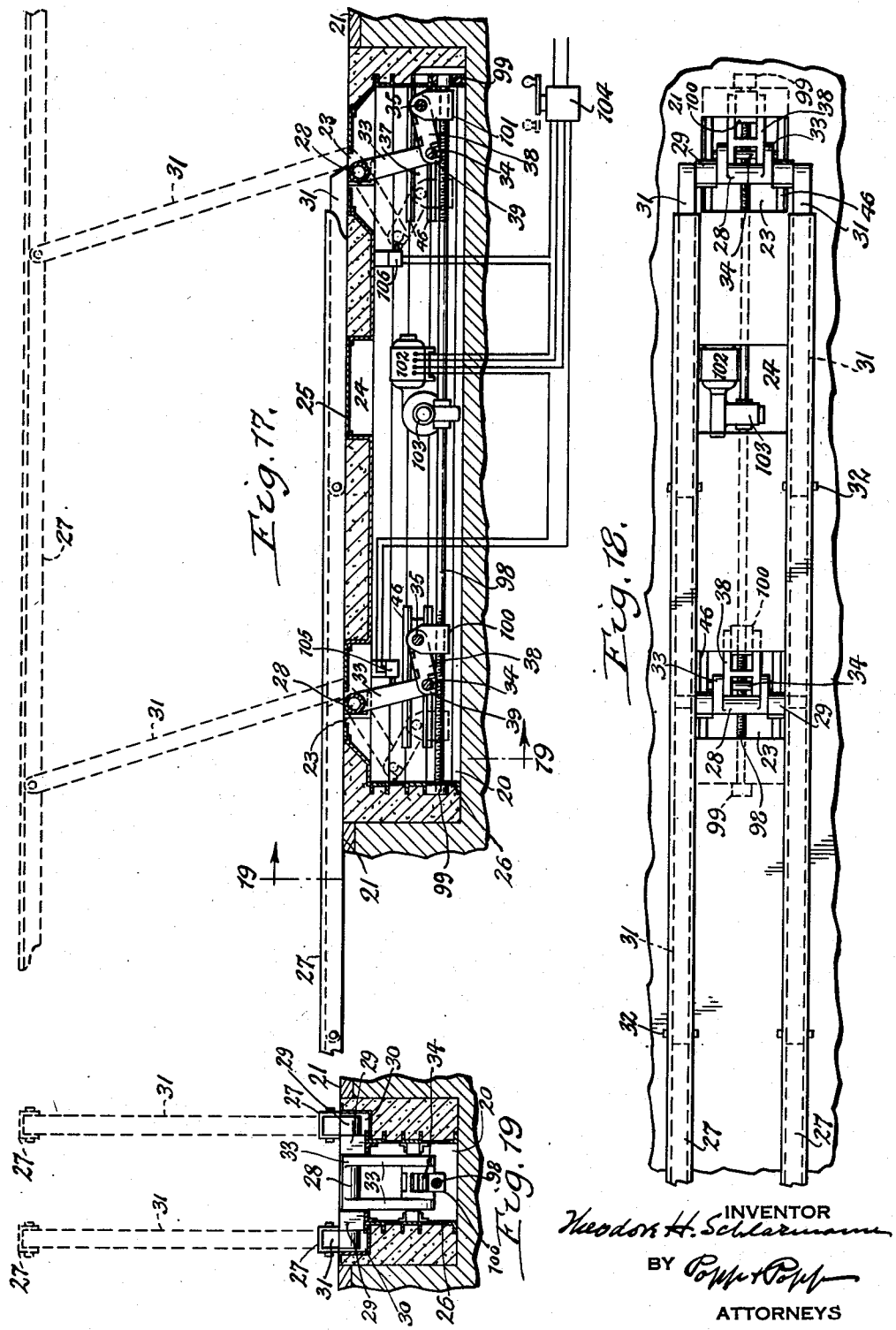

2,245,417

UNITED STATES PATENT OFFICE 2,245,417

VEHICLE LIFT

Theodore H. Schlarmann, Buffalo, N. Y.

Application December 23, 1939, Serial No. 310,805

9 Claims. (Cl. 254—91)

This invention relates to a lift which is more particularly intended for raising vehicles, such as automobiles and the like, from the floor or ground so as to render the underside of the vehicle easily and conveniently accessible for inspection, adjustment and repair.

One of the objects of this invention is to provide such a lift for this purpose which is very strong, powerful and durable.

Another object is to so construct the lift that the same can be readily and quickly operated with a minimum expenditure of power.

A further object is to provide simple and efficient means for locking the lift in its elevated position and thus ensure safety while using the same.

Additional objects of this invention are to provide adapters which permit the lift to be used in connection with vehicles of various construction, and to improve the lift in several details of construction.

In the accompanying drawings:

Fig. 1 is a vertical longitudinal section, on a reduced scale, of a vehicle lifter embodying a form of this invention which is operated by fluid pressure.

Fig. 2 is a fragmentary, vertical, longitudinal section, on an enlarged scale, similar to Fig. 1, and taken on line 2—2, Fig. 3.

Fig. 3 is a fragmentary horizontal section, on an enlarged scale, taken on line 3—3, Fig. 1.

Fig. 4 is a fragmentary cross section, taken on line 4—4, Fig. 2.

Figs. 5 and 6 are vertical transverse sections, on an enlarged scale, taken on the correspondingly numbered lines in Fig. 2.

Fig. 7 is a fragmentary, vertical, longitudinal section, on a reduced scale, taken on line 7—7, Fig. 5.

Fig. 8 is a fragmentary, vertical section similar to Fig. 2, but showing the safety locking mechanism in a released position.

Fig. 9 is a fragmentary, vertical section, on an enlarged scale, taken on line 9—9, Fig. 7.

Fig. 10 is a fragmentary top plan view of a ramp and stop device for use in connection with this invention when the lifting bars are constructed to form runways which engage with the undersides of the wheels of the vehicle which is to be lifted.

Fig. 11 is a vertical, longitudinal section taken on line 11—11, Fig. 10 and showing the improved safety means for leading the wheels of a vehicle onto a bar of the runway and also preventing the same from leaving the runway when the latter is elevated, this figure showing the safety device in a position in which it serves as a stop to prevent the wheels of a car from rolling off the runway.

Fig. 12 is a similar view but showing the safety device in a position in which it serves to lead the wheels of a car to and from the runway.

Fig. 13 is a fragmentary, vertical cross section of an adapter forming part of this invention for mounting a car by its knee action on this lifter.

Fig. 14 is a top plan view of the adapter shown in Fig. 13.

Fig. 15 is a fragmentary, vertical, transverse section of an adapter forming part of this invention for use in mounting a car by its axle on this lifter.

Fig. 16 is a plan view of the adapter shown in Fig. 15.

Fig. 17 is a vertical longitudinal section of a vehicle lifter embodying this invention of a form which is operable by an electric motor.

Fig. 18 is a top plan view of the same.

Fig. 19 is a vertical, transverse section, taken on line 19—19, Fig. 17.

In the following description similar characters of reference indicate like parts in the several figures of the drawings.

Referring to the construction shown in Figs. 1–9, the numeral 20 represents the pit which is formed in the floor or surface 21 adapted to receive the main parts of the mechanism whereby a vehicle, such as a motor car or automobile, may be lifted in order that the same may be conveniently inspected, adjusted or repaired from its underside. The top of this pit is covered by a deck 22 which is preferably constructed partly of concrete slabs and partly of metal parts. Adjacent to its opposite ends the deck is provided with openings 23 for the passage of parts of the lifting mechanism and intermediate of its ends this deck is provided with a manhole 24 through which access may be had to the interior of the pit, this manhole being normally closed by a cover 25. Within this pit is arranged a main frame 26 of any suitable construction on which the working parts of the lifting mechanism are mounted.

Arranged lengthwise above the deck and the adjacent part of the floor a support is provided for the car which is to be lifted which support is constructed to suit the particular part of the car which is to be engaged during the lifting operation. If it is desired to lift the car by engagement of its transverse axles this support preferably consists of two transversely spaced supporting or lifting bars 27 arranged lengthwise over the deck and floor adjacent to opposite longitudinal sides of the pit, as shown by full lines in Fig. 1, and by dotted lines in Fig. 5. These lifting bars are preferably made of channel shape in cross section with the hollow side facing downwardly, as shown in Figs. 1, 6, 13 and 15, but the same may be made of any other suitable shape if desired.

Within the upper part of the pit adjacent to opposite ends thereof and below the respective deck openings 23 are arranged two horizontal transverse lifting shafts 28, each of which turns vertically at its opposite ends in bearings 29 mounted on the upper adjacent parts of the main frame and which project laterally into recesses 30 formed in the adjacent part of the floor, as best shown in Fig. 5.

The numeral 31 represents comparatively long lifting levers secured at their inner ends to opposite ends of the respective lifting shafts by welding or otherwise and extending along the respective deck openings 23 and each adapted to turn in a vertical plane lengthwise of the pit. The lifting levers on each lifting shaft form a set and the two corresponding lifting levers on each side of the pit have their outer ends pivotally connected by horizontal transverse pins 32 or the like with the flanges of one of the lifting bars 27 adjacent to opposite ends thereof. The lifting levers are of the same length so that upon turning the same the lifting bars will be raised or lowered in parallelism with the horizontal deck or floor.

In its lowermost position the lifting levers and lifting bars rest upon the floor on opposite longitudinal sides of the pit, as shown by full lines in Fig. 1, and while thus lowered a car to be treated is run over these bars and the latter are raised into the position indicated by dotted lines in Fig. 1, whereby these bars are engaged with the underside of parts of the car and the latter is raised so that its underside is conveniently accessible for whatever attention or work is required thereon.

The means for rocking the lifting shafts are constructed as follows:

The numeral 33 represents a pair of operating arms which project downwardly in transversely spaced relation from each of the lifting shafts and have their upper ends connected with the underside of the respective lifting shaft by welding or otherwise while their lower ends are connected by a horizontal transverse coupling bar 34. On the rear side of each pair of operating arms is arranged an actuating member 35 which reciprocates lengthwise in the pit and from which motion is transmitted to the operating arms. These actuating members are preferably constructed in the form of rods which are arranged transversely in the pit and each rod is guided to move horizontally therein by mounting opposite ends of each of these rods on shoes 36 which slide horizontally in longitudinal guideways 37 formed between pairs of retaining bars 46 secured to the main frame on opposite longitudinal sides of the pit. Motion is transmitted from each of these actuating rods to the respective coupling rod by a duplex link comprising two longitudinal side bars 38 which are connected at their rear ends with said actuating rod so as to rotate about the axis of the latter, and are provided respectively at their front ends with hooks 39 which are adapted to be engaged with and disengaged from the respective coupling rod. The two side bars of each coupling link are connected by cross bars 40. When the link is lowered so that its hooks 39 engage with the coupling bar 34 then the reciprocating rod 35 will rock the operating arms 23 and raise and lower the lifting levers together with the load mounted thereon. Upon lifting the coupling link 38 out of engagement with the coupling bar the lifting levers and associated parts will be uncoupled from the actuating rod and thereby facilitate assembling and disassembling these members when erecting the lifting mechanism or repairing, cleaning or adjusting the same.

In order to avoid accidental disengagement of each coupling link from the respective coupling bar a retaining screw 41 is mounted on each of these links and engaged with the underside of the respective coupling rod, as shown in Figs. 2 and 3.

Longitudinal reciprocation of the two actuating rods or members 35, 35 is effected by fluid operated mechanism which includes front and rear motor cylinders 42, 43 arranged in tandem relation in the pit adjacent to the front and rear ends thereof and pistons 44, 45 reciprocable lengthwise in these respective cylinders and operatively connected with the actuating rods. These cylinders are stationary and have their axes arranged horizontally and lengthwise in line with each other and the same are preferably held against movement by means of studs 47 projecting laterally from opposite sides of these cylinders in the longitudinal guideways or slots 37 formed between the respective pairs of retaining bars 46 and held against lengthwise movement by fixed stops 48 secured by welding to the bars 46 and engaging with the outer side of the studs at one end of each cylinder and removable stops 49 having the form of bolts secured to the retaining bars 46 and engaging the outer side of the studs at the opposite end of each cylinder, as best shown in Figs. 2 and 3.

The pistons are preferably moved forwardly in the cylinders by introducing compressed air in the rear ends of the cylinders through air pipes 50 which receive the same from suitable air compressing means whereby the lifting bars 27 and the load thereon are raised and these pistons are moved rearwardly in the cylinders by the weight of the lifting bars and the load resting on the same. Suitable valve mechanism is provided in connection with the air pipes for supplying live compressed air to the cylinders and discharging the spent air therefrom.

For the purpose of making the apparatus as short as possible and thus reducing the cost, the front cylinder 42 is arranged in rear of the front actuating rod 35 and the rear cylinder 43 is arranged in front of the rear actuating rod 35.

As shown in Figs. 1, 2 and 3 the piston 44 of the front cylinder 42 is connected directly with the actuating rod 35 immediately in front of the same by means consisting preferably of a piston rod having two parallel sections 51 arranged lengthwise on opposite sides of the longitudinal center of the respective cylinder. The piston 45 of the rear cylinder is connected indirectly with the actuating rod in rear of this cylinder by means of an intermediate shifting rod 52 arranged transversely between the cylinders, a rear piston rod consisting of two sections 53 arranged on opposite sides of the longitudinal center of the rear cylinder and secured at their opposite ends to the rear piston 45 and the intermediate rod 52, and two shifting bars 54 arranged lengthwise on opposite sides of the rear cylinder 43 and connecting opposite ends of the intermediate rod 52 with the corresponding ends of the rear actuating rod 35. The opposite ends of the intermediate shifting rod 52 are mounted in shoes 55 which slide lengthwise in the guideways formed between the pairs of retaining bars 46 on opposite sides of the frame. For the purpose of maintaining the front and rear actuating rods 35 and the intermediate shifting rod 52 always in the properly spaced relation and causing the same to move in unison the shifting bars 54 are provided with forward extensions 105 which are arranged on opposite sides of the front cylinder 42 and are connected with opposite ends of the front actuating rod 35.

In order to prevent the lifting mechanism from stopping suddenly when it reaches the top of its movement means are provided which cushion the last part of this movement and which preferably consist of cushioning means mounted on the frame and arranged in the path of some upwardly movable part of the lifting mechanism. As shown in Figs. 1, 2, 3 and 4 each of these cushioning means preferably consists of a plurality of leaf springs 106 having their central parts secured to the upper part of the main frame in front of one of the frame openings 23 while their opposite ends are arranged in front of the operating arms 33 of the respective lifting shaft so that these arms, during the last part of their forward and upward movement, will engage the same and thereby serve as a yielding stop for the lifting mechanism which saves the same, as well as the car loaded thereon, from undue shock and also avoids liability of displacing the car on the lifting bars 27. As these cushioning springs are under tension when the lifting mechanism is in its elevated position, this tension serves to start this mechanism in its downward movement.

An improved safety mechanism is provided whereby the lifting mechanism may be positively locked in its elevated position and prevented from accidentally descending and possibly injuring operators or damaging property. This safety mechanism in the form shown in Figs. 2, 3, 7, 8 and 9 is constructed as follows:

In the preferred construction this safety mechanism consists of two units of substantially the same construction and the following description of one of these units will therefore apply to both of them but it is to be understood that one or more of such units may be employed in conection with the vehicle lift according to the load which is to be carried and other conditions.

Each unit of this safety mechanism includes two longitudinal racks 57 rigidly mounted on the lower part of the main frame at one end of the pit and each rack is provided with a plurality of forwardly facing detent shoulders 58 arranged in a longitudinal row. The shoulders of each of these racks are adapted to be engaged by a locking hook or jaw 59 arranged on the front end of a locking latch or arm 60 which latter is pivoted to swing vertically and also move horizontally with the piston of the adjacent motor cylinder by mounting this arm on the respective actuating rod 35, as shown in Figs. 2 and 3. If desired only one rack and one latch may be employed as part of each locking unit but if two of such latches are used the same are caused to move in unison by a transverse yoke bar 61 which connects the same.

During the forward movement of the pistons, actuating rod 35 and associated parts for raising the lifting bars 27 the several latches trip forwardly over the detent shoulders and engage successively with the same and when the lifting bars have reached the desired elevation the hooks of the several latches remain in engagement with the respective detent shoulders and positively hold the lifting bars and the load supported thereon in an elevated position.

For the purpose of releasing the latches from the shoulders of the detent racks releasing means are provided which embody the present invention and are constructed as follows:

The numeral 62 represents two horizontal releasing bars arranged lengthwise in the lower part of the pit and frame and on the opposite side of the longitudinal center of the same and adapted to engage with the underside of the yoke rods 61 of the latches. When these releasing bars are depressed, as shown by dotted lines in Fig. 7, the yoke bars 61 are permitted to drop sufficiently to permit the hooks 59 of the latches to engage with the detent shoulders 58 of the detent racks, as shown by full lines in Fig. 2, thereby causing these hooks to engage these shoulders during the forward movement of the motor pistons. Upon raising the releasing bars 62 the same engage with the underside of the yoke rods 61 and disengage the several latches 60 from the shoulders of the detent racks 57, as shown by full lines in Figs. 7, 8 and 9, whereby the lifting mechanism is released, and the motor pistons and associated parts are permitted to move rearwardly and the lifting bars 27 are permitted to descend by gravity together with any car which may be carried thereby. The control means for raising and lowering the releasing bars 61 include two supporting links 63, 64 connecting the front and rear ends of each releasing bar with the adjacent parts of the main frame, a control lever pivoted on the main frame and having one arm 65 connected by an intermediate link 66 with the front supporting link 63 while its opposite arm 67 projects upwardly through an opening in the deck 22 and is provided above the latter with a raising pedal 68, and a lug 69 projecting upwardly from the front arm 65 of the control lever through an opening in the adjacent part of the deck and provided above the latter with a lowering pedal 70, as shown in Fig. 7.

Upon depressing the lowering pedal 70 the releasing bars 62 are lowered to permit the latches to move forwardly and interlock with the shoulders of the detent rack and upon depressing the raising pedal 68 these bars are elevated so as to disengage the latches from the detent racks and permit the lifting mechanism to descend. The lowering and raising pedals can be operated by foot pressure for holding the elevating mechanism in any desired elevated position and also releasing the same so that it may be lowered from this position. It is preferable, however, to so organize the control means that the lowering of the releasing bars 62 is effected automatically during the last part of the downward movement of the lifting mechanism, this being preferably accomplished by arranging the lowering pedal 70 in the downward path of one of the lifting levers adjacent to the lifting shaft 28 connected therewith, as shown in Figs. 5 and 7, whereby each respective lifting lever during the last part of its downward movement will engage the lowering pedal 70 and depress the same and thereby lower the releasing bars and the latches so that the latter are prepared to interlock with the detent racks during the following raising action of the lifting mechanism.

Means are provided for yieldingly holding the control mechanism in either the latch engaging or disengaging position, which means may consist of a leaf spring 71 secured to the main frame and provided with upper and lower seats 72, 73 either of which may be engaged by the outer arm 65 of the control lever for holding the latter in either extreme of its throw which correspond to the disengaged and engaged positions of the latches.

Instead of using the lifting bars 27 shown in Figs. 1 and 5, which are more particularly intended for lifting vehicles by engaging these bars with the underside of the axles of the same such as an automobile or motor car, these bars may be replaced by lifting bars similar to the lifting bar 74 shown in Figs. 10, 11 and 12 and which is designed to lift an automobile or car by engaging the undersides of its wheels, such bar being provided with an upstanding longitudinal flange 75 whereby the wheels of the car are held against sliding laterally from the runway formed by the upper side of this lifting bar.

When using lifting bars of the character shown in Figs. 10, 11 and 12 means are provided which serve the purpose of ramps upon which the wheels of the car run from the floor to the runways of the lifting bars, and vice versa, and also the purpose of retainers which prevent the wheels from rolling off the runways when the lifting mechanism is elevated. These ramp and retaining means are constructed as follows:

The numeral 76 represents a runway plate of sheet metal which has a comparatively long outer part 77 adapted to form an incline ramp and a short inner part 78 adapted to form a retainer or stop, these parts being arranged at a slight angle relative to each other with the convex side of the same facing upwardly. On the concave side of its corner this runway plate is pivotally connected by a horizontal transverse pin 80 with an end of the lifting bar 74 so that upon turning this plate in one direction the retainer section 78 will project upwardly relative to this lifting bar and form an obstruction at one end of the runway on this bar, as shown in Fig. 11, while upon turning this runway plate in the opposite direction until its inner retainer or stop section 78 engages with a shoulder or stop 81 on the adjacent part of the respective lifting bar, this retainer section will be in line or flush with the runway on this bar, as shown in Figs. 10 and 12. The runway plate when free is yieldingly held in a substantially upright position by means of a leaf spring 82 secured at one end to the underside of the lifting bar 74 and connected at its opposite end with a crank 83 on the underside of the runway plate.

When the lifting bar 74 is in its lowermost position the outer end of the ramp section 77 of the runway plate engages the floor or deck of the lifting apparatus and turns this plate so that the retainer section 78 of the same is even with the runway surface on this lifting bar, as shown in Fig. 12, thereby permitting the wheel of a vehicle to be conveniently rolled from the floor and up the runway plate to the top of the lifting bar, and also rolled downwardly off this runway to the floor. While the runway plate is in this position the leaf spring 82 is strained in such manner that when the respective lifting bar has effected the initial part of its upward movement, the runway plate will be automatically turned by the spring 82 from the substantially horizontal position shown in Fig. 12 to the substantially vertical position shown in Fig. 11, in which position the inner section 78 of the runway plate projects upwardly across the path of the runway at the respective end of the lifting bar and forms a retainer or stop which will be engaged by a motor wheel mounted on this lifting bar and prevent the same from rolling off the respective lifting bar.

If desired an adapter may be employed for lifting automobiles by engagement with the underside of the knee action of the running gear or chassis of the car. Means suitable for this purpose are shown in Figs. 13 and 14 and comprise a pair of saddle bars 84 arranged transversely on the lifting bars 27 so that the upper side of the same can be engaged with the underside of the knee action 85 of an automobile, as shown in Fig. 13. The central parts of these saddle bars 84 are connected on their underside by a plate 86 and adjacent to the ends of these bars the same are connected on their underside by locating cleats 87 which engage with opposite sides of the lifting bars 27 and hold the saddle bars against transverse movement thereon.

For preventing transverse displacement of the automobile on these saddle bars the opposite ends of the same are provided with stop lugs 86 which are adapted to engage with opposite lateral ends of the knee action, as shown in Fig. 13. In order to provide the necessary clearance for the accommodation of the transverse steering rods 87 of the steering mechanism adjacent to the knee action the two saddle bars 84 which engage the knee action are separated lengthwise of the lifting bars 27 to receive this part of the steering mechanism, as shown in Fig. 14.

In some cases it may be preferable to support an automobile on the underside of its rear axle housing having a central gear case 88 and hollow arms 89 extending laterally from said case, as shown in Fig. 15. In such a case an adapter is provided which comprises a pair of transverse saddle bars 90 adapted to rest on the lifting bars 27 and connected at their corresponding ends with stop plates 91 engaging with the outer sides of the lifting bars to hold the saddle bars 90 against transverse displacement thereon, and a pair of supporting rollers 92 mounted lengthwise on the saddle bars 90 and engageable with the gear case 88 on opposite sides of its center, as shown in Figs. 15 and 16. This axle housing may be additionally supported on the lifting bars by means of chock plates 93 engaged at their lower edges in sockets 94 on the saddle bars 90 and bearing at their upper edges against the underside of the arms 89 of the axle housing. The rollers 92 and the chock seats 94 for this purpose may be arranged on the same side of the saddle bars 90 but if the character of the supporting surface on the underside of an automobile does not permit the use of the rollers 92 but will permit the use of the chocks 93 then the bars 90 may be reversed in order to present only sockets 95 on the upper side thereof for the reception of chock plates 93 for engagement with the underside of the axle housing arms 89.

Instead of operating the actuating rods or members 35 by means of the fluid pressure mechanism shown in Figs. 1, 2, 3, 5 and 6 this may be accomplished by electrically operated screw mechanism of the character shown in Figs. 17, 18 and 19 which is constructed as follows:

The numeral 98 represents a horizontal screw shaft arranged lengthwise in the lower part of the pit and journaled at its opposite ends in bearings 99 which permit this shaft to turn but hold the same against longitudinal movement. Adjacent to its opposite ends two screw nuts 100, 101 are mounted on this screw shaft so that upon turning the latter in one direction the screw nuts will be moved forwardly while upon turning the same in the opposite direction the screw nuts will be moved rearwardly. On their upper sides these screw nuts are connected respectively with actuating rods 35 of the lifting mechanism arranged in opposite ends of the pit and are operatively connected with the lifting bars 27 above the floor and deck of the pit by substantially the same means which are employed in connection with the pneumatic motors shown in Figs. 1, 2, 3, 5 and 6 and the same description and reference characters therefore apply to corresponding parts of both these pneumatically and electrically operated structures.

The electric motor 102 for operating the screw shaft 98 is preferably arranged in the central part of the pit and mounted on the adjacent part of the main frame and its driving shaft is operatively connected by gearing 103 which may be of any suitable construction.

Various means may be employed for controlling the current which is supplied to the motor but this is preferably accomplished by a master hand operated switch 104 which is arranged in the circuit of the motor and controls the rotation of the same in either direction, and front and rear stop switches 105, 106 arranged in circuit with the main switch and the motor and operating to open said circuit for stopping the motor automatically when the lifting mechanism is in its lowered position by engagement of a front operating arm 33 with the front stop switch 100, and to open said circuit for stopping the motor automatically when the lifting mechanism is in its highest position by engagement of the rear coupling rod 34 with the rear stop switch 106. Any other suitable switch mechanism may be employed if desired.

The construction of the vehicle lift shown in Figs. 1-9 employs two fluid pressure operated units for actuating the lifting bars which is designed for lifting comparatively heavy vehicles or loads but if the lift is intended for raising comparatively light vehicles or loads one of these units may be omitted. Likewise one of the screw operated units shown in Figs. 17 and 18 may be omitted if the lift is intended for raising light vehicles or loads instead of relatively heavy ones.

Although this invention has been described more particularly for lifting vehicles it is to be understood that the same can be used for raising and lowering other kinds of loads such, for example, as moving merchandise or freight from one elevation to another.

I claim as my invention:

1. A vehicle lift comprising a main frame, two sets of vertically swinging lifting levers arranged in longitudinally spaced relation and each set pivoted at its lower end on said frame to turn about a transverse axis, supporting bars adapted to carry a vehicle and pivotally connected at longitudinally spaced points with the upper ends of the two sets of levers, two transverse rock shafts journaled in longitudinally spaced relation on said frame and each shaft connected with the lower ends of one set of lifting levers, a pair of operating rock arms connected with each of said rock shafts and projecting downwardly therefrom, a coupling bar connecting the lower ends of each pair of rock arms, two transverse actuating bars movable lengthwise of said supporting bars, longitudinal guideways on said frame for said actuating bars, and coupling means for detachably connecting each of said actuating bars with the respective coupling bar of one pair of operating arms and each consisting of a link pivoted at one end on said actuating bar and provided at its opposite end with a hook which engages with the respective coupling bar.

2. A vehicle lift comprising a main frame, two sets of vertically swinging lifting levers arranged in longitudinally spaced relation and each set pivoted at its lower end on said frame to turn about a transverse axis, supporting bars adapted to carry a vehicle and pivotally connected at longitudinally spaced points with the upper ends of the two sets of levers, two transverse rock shafts journaled in longitudinally spaced relation on said frame and each shaft connected with the lower ends of one set of lifting levers, a pair of operating rock arms connected with each of said rock shafts and projecting downwardly therefrom, a coupling bar connecting the lower ends of each pair of rock arms, two transverse actuating bars movable lengthwise of said supporting bars, longitudinal guideways on said frame for said actuating bars, coupling means for detachably connecting each of said actuating bars with the respective coupling bar of one pair of operating arms and each consisting of a link pivoted at one end on said actuating bar and provided at its opposite end with a hook which engages with the respective coupling bar, and a prime mover operatively connected with said actuating bar and adapted to reciprocate the same lengthwise of said supporting bars.

3. A vehicle lift comprising a main frame, two sets of vertically swinging lifting levers arranged in longitudinally spaced relation and each set pivoted at its lower end on said frame to turn about a transverse axis, supporting bars adapted to carry a vehicle and pivotally connected at longitudinally spaced points with the upper ends of the two sets of levers, two transverse rock shafts journaled in longitudinally spaced relation on said frame and each shaft connected with the lower ends of one set of lifting levers, a pair of operating rock arms connected with each of said rock shafts and projecting downwardly therefrom, a coupling bar connecting the lower ends of each pair of rock arms, two transverse actuating bars movable lengthwise of said supporting bars, longitudinal guideways on said frame for said actuating bars, coupling means for detachably connecting each of said actuating bars with the respective coupling bar of one pair of operating arms and each consisting of a link pivoted at one end on said actuating bar and provided at its opposite end with a hook which engages with the respective coupling bar, and means for reciprocating said actuating bars lengthwise of the supporting bars including screw nuts connected respectively with said actuating bars, a screw shaft engaging said screw nuts and capable of rotation but held against longitudinal movement, and a motor for rotating said shaft in either direction.

4. A vehicle lift comprising a main frame, vertically swinging lifting means for raising a vehicle including front and rear lifting levers pivoted on said frame, fluid operated means for actuating said levers including front and rear cylinders mounted on said frame and pistons reciprocating respectively in said cylinders, a front actuating rod arranged in front of the front cylinder and connected with the piston therein, a rear actuating rod arranged in rear of said rear cylinder, and means for connecting said rear actuating rod with the piston in the rear cylinder including an intermediate shifting member arranged transversely in front of the rear cylinder and connected with the piston therein, and two shifting bars arranged lengthwise on opposite sides of the rear cylinder and connected at their front ends with opposite ends of said intermediate member and at their rear ends with opposite ends of said rear actuating member.

5. A vehicle lift comprising a main frame, vertically swinging lifting means for raising a vehicle including front and rear lifting levers pivoted on said frame, fluid operated means for actuating said levers including front and rear cylinders mounted on said frame and pistons reciprocating respectively in said cylinders, a front actuating rod arranged in front of the front cylinder and connected with the piston therein, a rear actuating rod arranged in rear of said rear cylinder, an intermediate shifting member arranged transversely in front of said rear cylinder and connected with the piston therein, and longitudinal members arranged on opposite sides of said cylinders and each connecting corresponding ends of the actuating members and said intermediate shifting means.

6. A vehicle lift comprising a main frame, vertically movable lifting bars adapted to support the vehicle to be lifted, vertically swinging lifting levers connecting said bars with said frame, movable actuating means for operating said levers, and locking means for releasably holding said bars in an elevated position including a rack provided with a row of shoulders, a detent arm movable with said actuating means and having a hook adapted to engage said shoulders, and means for disengaging said detent arm from said shoulders.

7. A vehicle lift comprising a main frame, vertically movable lifting bars adapted to support the vehicle to be lifted, vertically swinging lifting levers connecting said bars with said frame, movable actuating means for operating said levers, and locking means for releasably holding said bars in an elevated position including a rack mounted lengthwise on said frame and provided with a longitudinal row of shoulders, a detent latch pivotally connected with said actuating means and provided with a hook adapted to engage with said shoulders, a releasing bar adapted to engage with said detent latch for disengaging its hook from said shoulders, and manually operated means for shifting said releasing bar.

8. A vehicle lift comprising a main frame, vertically movable lifting bars adapted to support the vehicle to be lifted, vertically swinging lifting levers connecting said bars with said frame, movable actuating means for operating said levers, and locking means for releasably holding said bars in an elevated position including a rack mounted lengthwise on said frame and provided with a longitudinal row of shoulders, a detent latch pivotally connected with said actuating means and provided with a hook adapted to engage with said shoulders, a releasing bar adapted to engage with said detent latch for disengaging its hook from said shoulders, and controlling means whereby said releasing bar is shifted manually to disengage said detent latch from said shoulders and to automatically engage the same therewith.

9. A vehicle lift comprising a main frame, lifting bars arranged lengthwise of the frame and adapted to support the vehicle to be lifted, means for raising and lowering said lifting bars including vertically swinging front and rear lifting levers pivotally connecting said lifting bars with said frame, movable actuating mechanism for operating said levers, and locking means for releasably holding said levers in an elevated position including front and rear horizontal racks mounted on the front and rear parts of said frame and each provided with a longitudinal row of shoulders, front and rear detent latches movable with said actuating mechanism and having hooks adapted to engage respectively with shoulders of said front and rear racks, a releasing bar adapted to engage its front and rear parts with said front and rear detent latches for disengaging the hooks thereof from the shoulders of said racks, links connecting the front and rear parts of said releasing bar with said frame, and a control lever having one arm connected with one of said links and also provided with a pedal adapted to be engaged by one of said lifting levers for automatically moving said releasing bar to permit said latches to engage said rack and also having another of its arms provided with a pedal adapted to be shifted manually for shifting said releasing bar to disengage said latches from said racks.

THEODORE H. SCHLARMANN.